(12) United States Patent
Watari

(10) Patent No.: US 6,553,267 B1
(45) Date of Patent: Apr. 22, 2003

(54) DATE ENTRY APPARATUS FOR INFORMATION DEVICE

(75) Inventor: Masakazu Watari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/288,218

(22) Filed: Apr. 8, 1999

(30) Foreign Application Priority Data

Jun. 26, 1998 (JP) ............................................ 10-179851

(51) Int. Cl.⁷ .............................................. G05B 19/18
(52) U.S. Cl. .............................. 700/16; 700/12; 705/9; 345/963
(58) Field of Search ................................ 700/161, 100, 700/102, 97, 17, 16, 14; 705/9; 345/963, 783, 777; 708/112

(56) References Cited

U.S. PATENT DOCUMENTS

| | | | | |
|---|---|---|---|---|
| 4,214,433 A | * | 7/1980 | Terao ........................... | 368/28 |
| 5,530,684 A | * | 6/1996 | Kataoka et al. ................ | 368/41 |
| 5,644,722 A | * | 7/1997 | Moyamoto et al. ............ | 705/9 |
| 5,689,687 A | * | 11/1997 | Nishioka ..................... | 345/556 |
| 5,732,399 A | * | 3/1998 | Katiyar et al. ................ | 705/8 |
| 5,734,597 A | * | 3/1998 | Molnar et al. ................ | 708/112 |
| 6,236,396 B1 | * | 5/2001 | Jenson et al. ................ | 345/339 |
| 6,323,883 B1 | * | 11/2001 | Minoura et al. ............ | 345/784 |

FOREIGN PATENT DOCUMENTS

| | | |
|---|---|---|
| JP | 55-135964 | 10/1980 |
| JP | 4-100137 | 4/1992 |
| JP | 6-52169 | 2/1994 |
| JP | 11265408 A  *  | 3/1998 |

* cited by examiner

*Primary Examiner*—Leo Picard
*Assistant Examiner*—Kidest Bahta
(74) *Attorney, Agent, or Firm*—Staas & Halsey LLP

(57) ABSTRACT

To accomplish an easier date entry operation, a date entry apparatus is provided to enter a date including a month and a day into an information device. The apparatus basically comprises a date acquiring element for acquiring a current date and a date specifying element for specifying the date including the month and the day on the basis of data indicative of the day entered and the current date acquired. Preferably, the apparatus further comprises a member storing a parameter for specifying a range of dates into which a user is allowed to set the date, and a date-range deciding element for deciding the range of dates on the parameter under the acquired current date being set as a reference day, wherein the date specifying element is configured so as to specify the date including the month and the day based on a date residing within the range of dates decided. For example, the date specifying element is configured to input the specified date into a program executed by the information device. Also a computer-readable medium into which a program providing the above functions is recorded is available.

9 Claims, 4 Drawing Sheets

DATE ENTRY APPARATUS FOR INFORMATION DEVICE

BACKGROUND OF THE INVENTION

The present invention relates to a date entry apparatus with which users can easily enter dates into an information device and also relates to a computer-readable medium storing program data which enables such date entry.

As information devices that can manage personal information, there are provided, for example, portable information terminals in which PIM (Personal Information Manager) software is implemented in a ROM (Read Only Memory) or computers that executes a PIM program. In these information devices, a PIM program is executed, during which time a schedule management function is selected as one function thereof. When this function is activated, a user can enter an arbitrary date, and write information about schedules on that date (or actions on past dates).

For making it easier for a user to enter dates, a conventional PIM program is provided with a graphical user interface which will be described below with reference to FIG. 1. When a "new entry" is selected by a user, a calendar screen for each month is displayed, as shown in FIG. 1, where the user uses a pointing device to point at any day on the calendar. Thus the device can recognize that the month (or week) displayed and the day pointed thereon have been entered.

In such date entry method, if a desired date to be entered exists in a month (or week) to which the current date belongs, the date entry operation becomes relatively easier. By contrast, unless a desired date to be entered exists in a month (or week) to which the current date belongs, a user should make the displayed calendar scroll until it becomes a month (or week) where the desired date exists, and point at the desired date on the scrolled calendar screen at last. In FIG. 1, for example, assume that a month to which the current date belongs is May and a desired date to be entered is June 1. A user is obliged to operate a pointing device to point at a "next month" button with a click, thereby the screen being changed to a June calendar. The user is required to point at the desired date on this screen for the first time. Users are terribly burdened with such scrolling operation for managing their schedules.

SUMMARY OF THE INVENTION

Accordingly, it is an object of the present invention to solve the problem in the conventional date entry method, i.e., to provide a date entry apparatus capable of easily entering a desired date without operation to scroll the screens.

The present invention pays attention to the fact that dates entered for schedule management are mostly within one week or one month from the entry operation date. In order to realize the foregoing object, the invention adopts the following configurations.

As shown in FIG. 2, the present invention provides, as one aspect, a date entry apparatus for entering a date into an information device. The apparatus basically comprises date acquiring means 23 for acquiring a current date, and date specifying means 24 for specifying the date including a month and a day on the basis of data indicative of the day entered and the current date acquired.

According to this configuration, on the basis of a current date acquired by the date acquiring means 23 and entered data indicative of a date, the date specifying means 24 enables specification of a date including a month and a day. Therefore, it is enough for a user to enter a date corresponding to an objective date to be entered. The objective date is thus inputted into an information device. Since a range of dates into which the date entry is allowed is decided on the acquired current date as a reference, the schedule management can be performed with flexibility even when schedules change from time to time.

For example, the date specifying means is configured to input the specified date into a program executed by the information device.

Preferably, the above configuration can be developed to further comprise a parameter storing member storing a parameter for specifying a range of dates into which a user is allowed to set the date; and date-range deciding means for deciding the range of dates on the parameter under the acquired current date being set as a reference day, wherein the date specifying means is configured so as to specify the date including the month and the day based on a date residing within the range of dates decided by the date-range deciding means.

According to this developed configuration, the date-range deciding means decide the date range on the basis of the acquired current date and the parameter stored. The date range thus-decided depends on setting of the parameter, and can be confined to the dates of one month or one week. In such case, any day existing within the date range can be specified by only a day included in the date. Hence, the date including a entered day is specified by the date specifying means from the range of dates decided by the date-range deciding means. The parameter can be set beforehand, or can be customized freely by a user in order to realize entry of convenient dates.

It is preferred that in the foregoing developed configuration, the parameter has a first parameter for specifying a relative difference between a start day of the range of dates and the reference day and a second parameter for specifying a length of the range of dates.

It is also preferred that in the foregoing developed configuration, the date specifying means has means for determining whether or not the entered date exists within the range of days decided by the deciding means and means for issuing alarm toward the user unless the entered date exists within the range of days.

As another aspect of the present invention, there is provided a computer-readable medium into which a program is recorded which is executed by a computer connected with an input apparatus to which data indicative of a day are entered by a user, the program providing the functions of; acquiring a current date; and specifying the date including a month and the day on the basis of the data indicative of the day entered and the current date acquired.

By way of example, the program further provides the functions of; storing a parameter in the computer for specifying a relative range of dates into which the user is allowed to set the date; deciding the range of dates on the parameter under the acquired current date being set as a reference day; and specifying, as the date specifying functions, the date including the month and the day based on a date residing within the range of dates decided. In this configuration, preferably, the parameter has a first parameter for specifying a relative difference between a start day of the range of dates and the reference day and a second parameter for specifying a length of the range of dates.

It is also preferred that in the above configuration, the date specifying function includes determining whether or not the date including the day indicated by the data entered to the input apparatus exists within the range of days decided and issuing alarm toward the user unless the date exists within the range of days.

DESCRIPTION OF THE PREFERRED EMBODIMENTS

Figure 1:
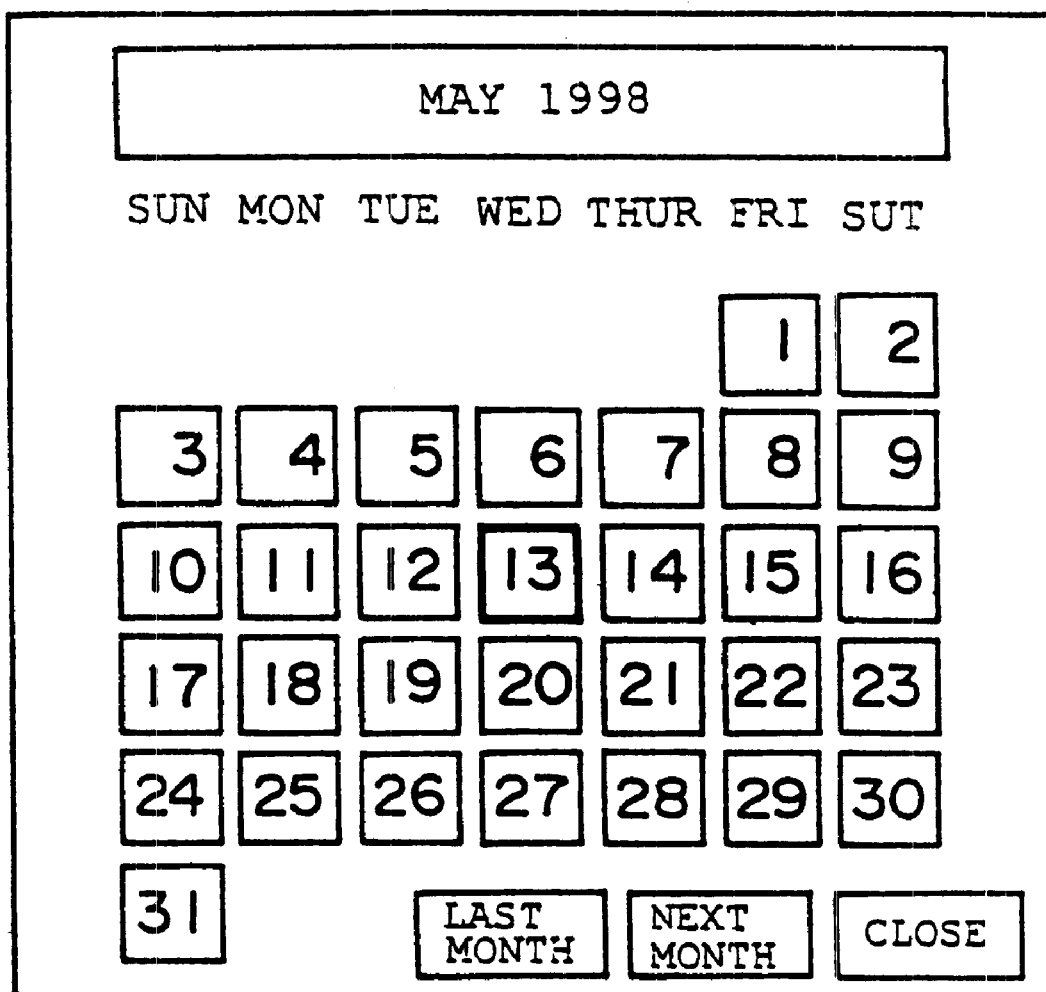
FIG. 1 shows one example of the screen for entering dates according to a conventional method.
Figure 2:
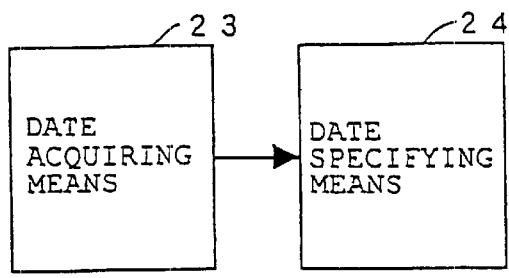
FIG. 2 functionally shows the principle of the present invention.
Figure 3:
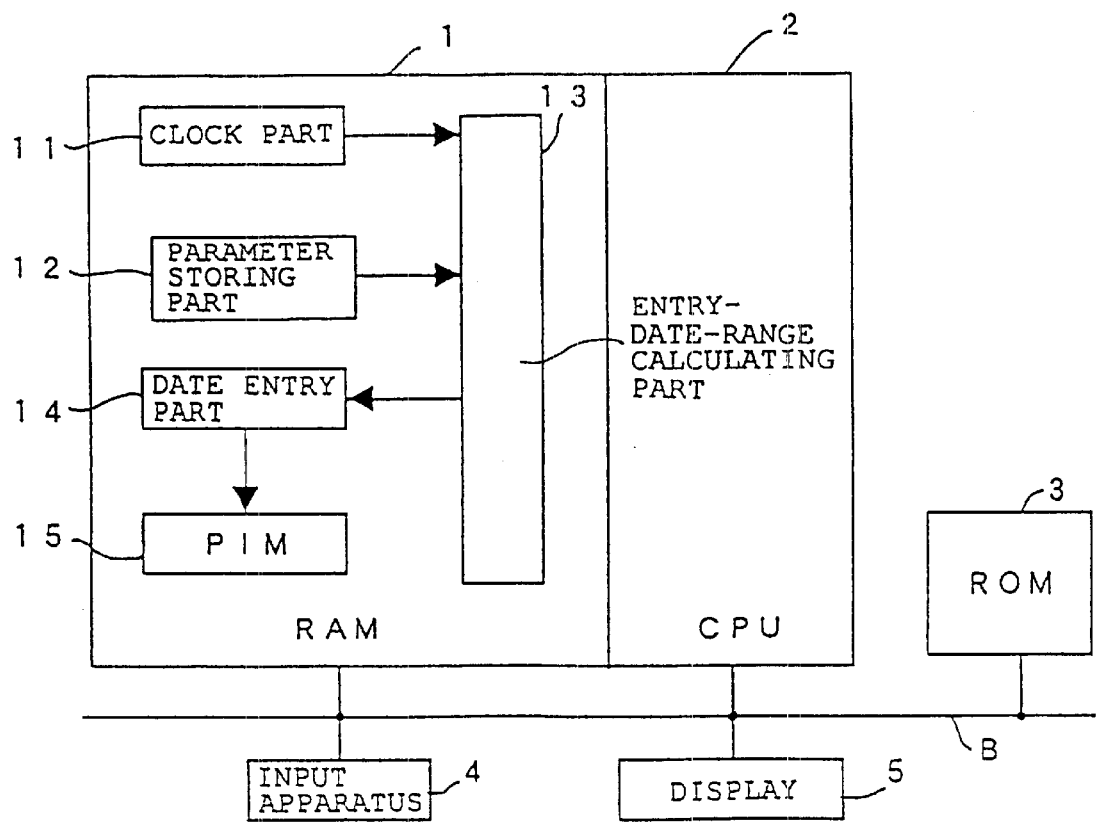
FIG. 3 is a block diagram showing the circuitry configuration of an information device according to an embodiment of the present invention.
Figure 4:
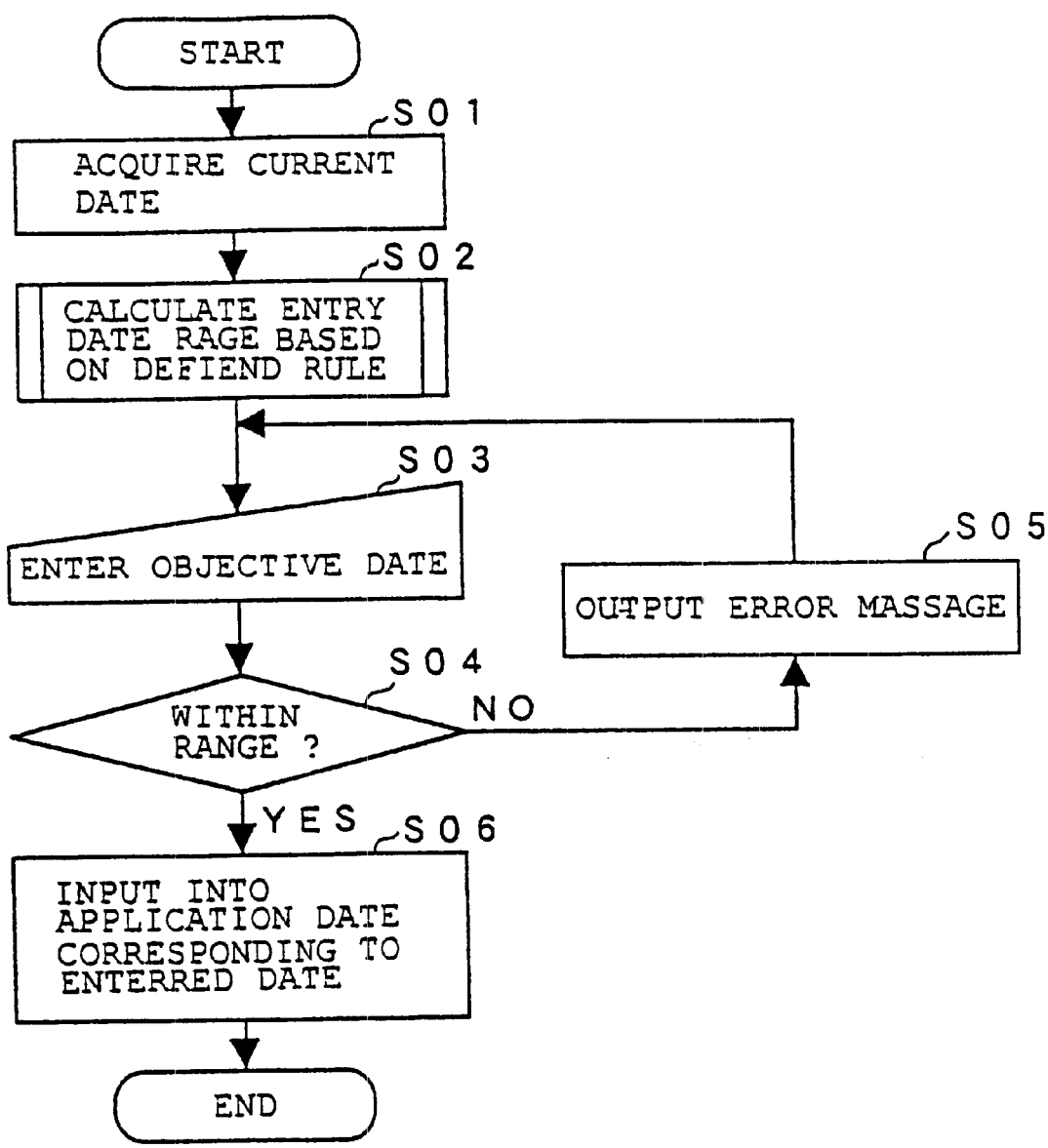
FIG. 4 is a flowchart representing an entry control program executed by a CPU in FIG. 3.
Figure 5:
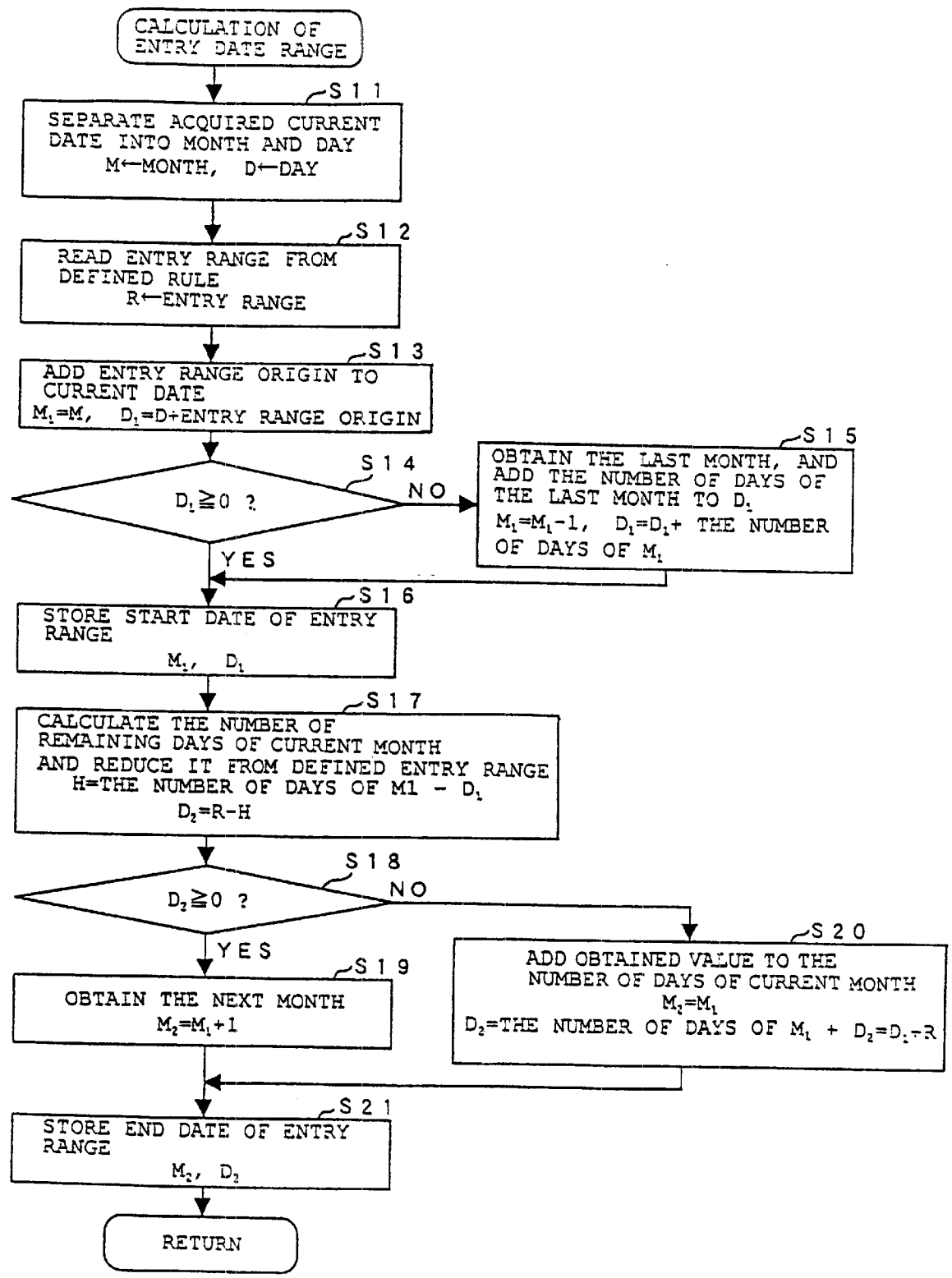
FIG. 5 is a flowchart representing a subroutine for calculating a range of dates to be entered, executed in processing according to FIG. 4.

Referring to FIGS. 3 to 5, an embodiment of the present invention will now be described. In the following explanation, the term "date" is defined as a "month and day," the term "month" as simply a "month," and the "day" as simply a "day." Alternatively, it is possible to define those terms into another way, such as the "date" as an "year, month and day," and the "month" as an "year and month."

FIG. 3 is a block diagram showing circuitry of an information device according to an embodiment of the present invention. As shown in FIG. 3, the information device is provided with a RAM 1, CPU 2, ROM 3, input apparatus 4, and display 5, which are connected to each other through a bus B.

The input apparatus 4 consists of a keyboard or pointing device, such as a mouse or touch panel, which is arranged on a not-shown casing of the information device. The input apparatus 4 is operated by users to provide desired data for the CPU 2. Thus, using this input apparatus 4 permits users to entry information about a "day" for specifying objective dates to be entered.

The display 5, which consists of a displaying apparatus such as a CRT or liquid crystal panel, is designed to display images produced by the CPU 2.

The ROM 3 constitutes a computer-readable medium that stores an OS (operating apparatus) including a date-entry control program and application programs such as a PIM program 15. By the CPU 2, the date-entry control program is developed on the RAM 1 and executed.

The RAM 1 is a working area where a program read from the ROM 3 is processed by the CPU 2. In cases the date-entry control program is read by the CPU 2, modules for a clock part 11, parameter storing part 12, entry-date-range calculating part 13, and date entry part 14 are processed on the RAM 1. The PIM program 15 read by the CPU 2 is also processed on the RAM 1.

The clock part 11 is a software timer that acquires a current date by counting clocks not-shown. The current date thus-acquired is provided to the entry-date-range calculating part 13. Alternatively, the clock part 11 may be constructed by a hardware unit placed outside the RAM 1.

The parameter storing part 12 is a working area where an "entry range origin" and an "entry range", which are pre-entered by an user, are stored. The "entry range origin" is a parameter indicative of a difference between the origin of a range of dates into which date entry is allowed and a current date (reference day). That is, this parameter composes a first parameter for specifying a relative difference between the origin of a range of dates for which the date entry is allowed and a reference day. For example, when the "entry range origin"=+3 is achieved, it means that possible dates to be entered starts three-days after from a current date and follows it. If the "entry range origin"=0, it means that possible dates to be entered are a current date or after. Further, if the "entry range origin"=−3, possible dates to be entered start three-days before to a current date and follows it. On one hand, the "entry range" is a parameter representing a relative range of dates for which the date entry is allowed, based on the "entry range origin" taken as an origin. This parameter constitutes a second parameter for specifying the length of a range of dates for which the date entry is allowed. For example, the "entry range"=30 means that possible dates to be entered are only 30 days from a date expressed by the "entry range origin." By way of example, it is preferred that both the "entry range origin" and the "entry range" be customized by users using an editing program not-shown. It is also possible that the parameter storing part 12 be configured by one or more dedicated memories placed outside the RAM 1.

The entry-date-range calculating part 13, which functions as date range deciding means, calculates an absolute range of dates (hereinafter, referred to as "entry date range") for which the date entry is allowed, on the basis of the current date provided from the clock part 11 and the "entry range origin" and the "entry range" stored in the parameter storing part 12. The entry-date-range calculating part 13 notifies the date entry part 14 of the entry date range calculated.

The date entry part 14, which acts as date specifying means, determines if or not a corresponding date including a "day" entered via the input apparatus 4 exists within an entry date range notified by the entry-date-range calculating part 13. If such date including the entered "day" exists, the date allows the CPU 2 to be executed.

FIGS. 4 and 5 shows flowcharts that the CPU 2 executes as date-entry-control processing with use of modules 11 to 14 processed on the RAM 1. The processing shown in FIG. 4 starts in the course of executing the PIM program 15 in response to the selection of "new entry" by a user.

In FIG. 4, at the first step S01, the CPU 2 (functioning as the entry-date-range calculating part 13) acquires a current date from the clock part 11.

At the next step S02, the CPU 2 (functioning as the entry-date-range calculating part 13) calculates an entry date range on the basis of the current date acquired at step S01 and an "entry range origin" and an "entry range" stored in the parameter storing part 12. A subroutine for this entry-date-range calculating processing, which is executed at step S02, is shown in the form of a flowchart in FIG. 5.

Throughout this subroutine, the CPU 12 is configured to function as the entry-date-range calculating part 13. Specifically, at the first step S1, the CPU 2 separates the current date acquired at step S01 into a "month" and a "day," and substitutes the "month" into a variable as well as the "day" into another variable D.

At step S12, the CPU 2 reads the "entry range" stored in the parameter storing part 12, and substitutes the read "entry range" into another variable R.

At step S13, the CPU 2 adds the "entry range origin" stored in the parameter storing part 12 to the current date.

Practically the CPU 2 not merely substitutes the value of the variable M into a variable M1 indicative of a "month" to which a start day of the entry date range belongs but also substitutes the value of the variable D to which the "entry range origin" value has been added into another variable D1 indicative of a "day" to which the start day of the entry date range belongs.

At the next step S14, the CPU 2 determines whether or not the variable D1 value calculated at step S13 has become "0" or more. In the case that the variable D1 value has been "0" or more, the CPU 2 recognizes that both the start day of the entry date range and the current date belong to the same "month", the processing being routed to step S16.

To the contrary, if the variable D1 value is less than "0", the CPU 2 interprets that the start day of the entry date range belongs to the last month preceding a month to which the current date belongs. Thus, at step S15, the last month is obtained, and the total number of days of the obtained month is added to the variable D1. Specifically, the CPU 2 decrements the value of the variable M1, and adds to the value of the variable D1 the total number of days of a month indicated by the decremented variable M1. In decreasing the variable M1, if the value of M1 equals "1," a new M1 value "12" is set. After this, the processing is passed to step S16.

At step S16, the CPU 2 stores the start date of the entry date range into the date entry part 14. Namely the CPU 2 stores the current values of the variable M1 and D1 into the date entry part 14.

At the next step S17, the CPU 2 calculates the number of remaining days in the current "month," and reduces the number of the calculated remaining days from the entry date range. To be specific, the CPU 2 calculates the variable D1 value based on the total number of days belonging to a month indicated by the variable M1, and substitutes the calculated D1 value into a variable H. Then the CPU reduces the variable H value from the variable R value, substituting the reduced result into the variable D2.

At the next step S18, the CPU 2 again determines whether or not the value of the variables D2 which underwent the calculation at step S17 has become "0" or more. If the determination is that the value has become "0" or more, the CPU 2 gains recognition that an end day of the entry date range exists in the next month succeeding a month to which its start day belongs, obtaining the next month at step S19. Specifically, the CPU 2 increments the current value of the variable M1, and substitutes the incremented result into the variable M2. The CPU 2 then goes onto step S21.

In contrast, in cases where the value of the variable D1 is less than "0", the CPU 2 recognizes that the end day of the entry date range reside within the same month in which the start day thereof exists. Thus it adds the value of the variable D2 to the number of remaining days in the current "month" at step S20. That is, the CPU 2 substitutes a current value of the variable M1 into the variable M2, adds a current value of the variable D2 to the total number of days in a month indicated by the variable M1, and substitutes the added result into the variable D2. Alternatively, the CPU 2 may add a current value of the variable D1 to the variable R, then substitutes the added result into the variable D2. The processing executed by the CPU 2 then proceeds to step S21.

At step S21, the CPU 2 stores the end date of the entry date range into the date entry part 14. Practically, the CPU 2 stores current values of the variables M2 and D2 into the date entry part 14. After the execution at step 21, the CPU 2 terminates this subroutine to return the processing to step S03 of the main routine shown in FIG. 3.

At step S03 in the main routine shown in FIG. 3, the CPU 2 (functioning as the date entry part 14) inputs data representing "date" given by a user via the input apparatus 4 in order to specify an objective date to be entered.

Then at step S04, the CPU 2 (functioning as the date entry part 14) determines whether or not a date including the "month" entered at step S03 exists within the entry date range defined by the variables M1, D1, M2 and D2. Specifically, in the case that the variable M1 is smaller in value than the variable M2, whether or not the "day" entered at step S03 exists between the variables M1 and M2. When the variable M1 is larger in value than M2, it is further determined that the "day" entered at step S03 is not less than the value of the variable M1 or not more than the value of the variable M2.

When it was determined at step S04 that the "day" entered at step S03 is not within the entry date range, the CPU 2 (functioning as the date entry part 14) issues an error message at step S05, before returning the processing to step S03 to receive another "day" newly entered by a user.

On the other hand, when it was determined at step S04 that the "day" entered at step S03 is within the entry date range, the CPU 2 (functioning as the date entry part 14) sends to the PIM program 15 the "day" entered at step S03 and a value of the variable M1 or M2 corresponding to the day, as the objective date to be entered.

The information device thus-configured in this embodiment provides an operation according to entry control, which will be below. A precondition is that values of an "entry range" and an "entry range origin" are customized according to usage and stored into the parameter storing part 12 by a user. For example, a current date is Mar. 20, 1998, and the "entry range"=30 and the "entry range origin"=0 are set. In this situation, performing the date-entry control program described in FIG. 4 allows the entry date range to be set as a range from Mar. 20, 1998 to Apr. 19, 1998 at step S02. When the user enters "10(day)" in response to the obtained entry date range at step S03, a date of Apr. 10, 1998 is inputted into the PIM program 15 as an objective date to be entered. Likewise, if the user enters "31 (day)" as step S03, another date of Mar. 31, 1998 is inputted into the PIM program 15 as an objective date to be entered. To the contrary, an error message will be issued as step S05 when the user inputs some day which does not exist within the range (for example, February 20).

In the case of entering dates with days of the week, the present invention is easily practiced by defining necessary rules for specifying the days of the week.

Accordingly, the entry control apparatus incorporated in this information device permits date entry to be performed easily without the monitor screen scrolled.

Numerous other modifications and variations of the present invention will be apparent to those skilled in the art in view of the foregoing description. Thus, it is to be understood that, within the scope of the appended claims, the present invention may be practiced other than as specifically described hereinabove.

What I claim is:

1. A date entry apparatus for inputting a date into an information device, the apparatus comprising:
   a date acquiring device acquiring a current date;
   a date specifying device specifying a date including a month and a day based on data
   indicative of a day entered and the current date acquired;
   a parameter storing member storing a parameter specifying a range of dates into which a user is allowed to set a date; and a date-range deciding device deciding a range of dates of the parameter under the acquired current date being set as a reference day, wherein the date specifying device is configured so as to specify the date including the month and the day based on a date residing within the range of dates decided by the date-range deciding device.

2. The apparatus of claim 1, wherein the parameter has a first parameter specifying a relative difference between a start day of the range of dates and the reference day and a second parameter specifying a length of the range of dates.

3. The apparatus of claim 1, wherein the date specifying device has a determining part determining whether or not the entered date exists within the range of dates decided by the deciding device and issuing an alarm to the user unless the entered date exists within the range of dates.

4. A computer-readable medium into which a program is recorded which is executed by a computer connected with an input apparatus to which data indicative of a day are entered by a user, the program providing the functions of:

acquiring a current date;

specifying the date including a month and a day based on the data indicative of the day entered and the current date acquired;

storing a parameter in the computer specifying a relative range of dates into which the user is allowed o set the date;

deciding the range of dates of the parameter under the acquired current date being set as a reference day; and specifying, as the date specifying functions, the date including the month and the day based on the date residing within the range of the dates decided.

5. The medium of claim 4, wherein the parameter has a first parameter specifying a relative difference between a tart day of the range of dates and the reference day and a second parameter specifying a length of the range of dates.

6. The medium of claim 4, wherein the date specifying function includes determining whether or not the date including day indicated by the data entered exists within the range of dates decided and issuing an alarm to the user unless the date exists within the range of dates.

7. A method of entering data indicative of a day, the method comprising:

acquiring a current date;

specifying a date including a month and a day based on data indicative of the day entered by an input unit and the current date acquired;

storing a parameter in the computer specifying a relative range of dates into which the user is allowed to set the date;

deciding the range of dates of the parameter under the acquired current date being set as a reference day; and specifying the date including the month and the day based on a date residing within the range of dates decided.

8. The method of claim 7, wherein the parameter has a first parameter specifying a relative difference between a start day of the range of dates and the reference day and a second parameter specifying a length of the range of dates.

9. The method of claim 7, further comprising:

determining whether or not the date including the day indicated by the data entered exists within the range of dates decided and issuing alarm to the user unless the date exists within the range of dates.

\* \* \* \* \*